United States Patent
Moffatt et al.

(10) Patent No.: US 7,676,205 B2
(45) Date of Patent: Mar. 9, 2010

(54) ACTIVE RECEIVER DETECTION AND RANGING

(75) Inventors: Christopher D. Moffatt, Palm Bay, FL (US); James Tonti, Valkaria, FL (US); Gary J. Headley, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 838 days.

(21) Appl. No.: 11/532,642

(22) Filed: Sep. 18, 2006

(65) Prior Publication Data

US 2008/0070532 A1    Mar. 20, 2008

(51) Int. Cl.
*H04B 17/00* (2006.01)
*G01S 3/02* (2006.01)
(52) U.S. Cl. .................. 455/226.1; 342/458
(58) Field of Classification Search ........... 455/2.01, 455/456.1, 456.5, 226.1, 226.4; 342/450, 342/453, 458
See application file for complete search history.

(56) References Cited

U.S. PATENT DOCUMENTS

| | | | |
|---|---|---|---|
| 6,643,494 | B1 | 11/2003 | Worthy |
| 2006/0099967 | A1* | 5/2006 | Colvin et al. ............ 455/456.4 |

FOREIGN PATENT DOCUMENTS

| | | |
|---|---|---|
| FR | 2880227 | 6/2006 |
| GB | 2 321 151 | 7/1998 |

* cited by examiner

*Primary Examiner*—Nguyen Vo
(74) *Attorney, Agent, or Firm*—Darby & Darby PC; Robert J. Sacco (57) ABSTRACT

Method (500) and system (402) for actively detecting and determining a range of a remotely located radio receiver (100). The invention also provides a method and system to determine whether a remote receiver (100) is receiving a transmitted signal (418) and the minimum necessary transmitter power required to establish a communication link to the receiver (100). Finally, the invention also provides a method and system to resolve directional ambiguities due to multipath.

36 Claims, 6 Drawing Sheets

ACTIVE RECEIVER DETECTION AND RANGING

BACKGROUND OF THE INVENTION

1. Statement of the Technical Field

The inventive arrangements relate to detection of radio receiver devices, and more particularly to systems which can use active techniques to determine a range to a radio receiver device.

2. Description of the Related Art

There are many circumstances in which it can be useful to identify the presence of radio receiving devices. For example, identifying the presence of a radio receiver can be useful for many military, law enforcement and homeland security applications. Traditional techniques for performing this function have usually relied on various means for detecting RF emissions from the receiving device. Most often, the source of the RF energy can be directly or indirectly traced to a portion of a radio receiver which is known as a local oscillator.

Local oscillators are commonly included in superheterodyne type radio receivers as part of a down-conversion system. In a superheterodyne radio system frequencies of interest are converted to a constant lower frequency before detection. This constant frequency is called the intermediate frequency, or IF. In this regard, it is well known that certain IF frequencies are commonly selected by designers for certain types of radio receivers.

In order to perform the frequency conversion process from received RF signals to IF, superheterodyne receivers commonly perform a mixing operation that involves two signals. These signals include a signal produced by the local oscillator and an incoming RF signal. This process is performed in a mixer or mixing stage of the receiver. Within the mixer, the local oscillator signal interacts with the received RF signal to produce outputs known as mixing products at frequencies which are equal to the sum of the two input frequencies and difference of the two input frequencies. Other mixing products are also produced that are generally lower in amplitude than the sum and difference products. The receiver includes filtering circuits following the mixer stage to select either the higher or the lower of these frequencies as the IF. Receivers can use one or more mixing stages to produce a desired IF. The IF is typically amplified and is ultimately demodulated by other circuits in the receiver.

Given some information regarding the type of radio receiver to be detected, it is possible to make some reasoned estimates of the likely frequency of the IF signals in a receiver and the local oscillator frequency or frequencies necessary to produce those IF signals. Significantly, signals from the local oscillator and the IF stage of the receiver often radiate from the receiving device. Accordingly, conventional systems have typically confirmed the presence of a radio receiver within an area by using a narrow-band receiver to scan certain frequencies for the presence of such IF signals and/or local oscillator signals. If these emissions are present, it can be presumed that a radio receiver of a particular type is nearby. RF directional finding equipment has also been used in some instances to locate a direction in which such a receiver is located.

Despite the advantages offered by the foregoing systems, they have several important limitations. For example, existing systems do not provide any means for determining a range or distance to a radio receiver. Existing systems lack the ability to resolve directional ambiguities caused by reflections of signals from environmental and man-made structures such as mountains, bodies of water, buildings, airplanes, etc. Existing systems also lack the ability to determine if a target receiver is actually receiving a transmitted signal from a source. Finally, existing systems also do not generally provide any means for determining a minimum required power necessary for transmitted signals to be received by the target receiver.

SUMMARY OF THE INVENTION

The invention concerns a method and system for obtaining information concerning an RF receiver. In particular, the invention provides a method and system for actively detecting and determining a range of a remotely located radio receiver. The invention also provides a method and system to determine whether a remote receiver is receiving a transmitted signal and the minimum necessary transmitter power required to establish a communications link to the receiver. Finally, the invention provides a method and system to resolve directional ambiguities due to multipath.

The method includes three basic steps. These steps include monitoring one or more RF emissions of the RF receiver, generating an RF signal on an RF frequency that can be received by the RF receiver; and then detecting a variation in the receiver RF emission or emissions responsive to the RF signal. According to an aspect of the invention, the variation in the RF emission includes small changes in the one or more of the amplitude, phase, or frequency of one or more local oscillator signals, harmonics thereof, or mixing products in the receiver. These changes are caused by the transmitted RF signal. In effect, the transmitted RF signal can be used to cause a phase, frequency, amplitude, or combination of phase, frequency, or amplitude modulation of certain signals in the receiver. Such modulation can be caused by various aspects of the receiver design, such as coupling that exists between the local oscillator and other components of the receiver. These minor yet detectable variations can be detected and used for the purpose of active receiver detection and ranging.

In the foregoing method, the monitoring step includes receiving an RF emission which comprises RF energy originating from a local oscillator in the RF receiver. Optionally, the monitoring step includes selecting the RF emission or emissions which are monitored to include one or more emissions from the RF receiver other than, or in addition to, the local oscillator frequency. For example, the emissions can be chosen to include mixing products or RF energy harmonically related to a fundamental frequency of the local oscillator.

As noted above, the transmitted RF signal can advantageously cause a modulation of the RF emission. For example, such modulation can be a combination of one or more of phase, frequency, or amplitude modulation of the RF emission. The detecting step advantageously further includes detecting a predetermined modulation pattern in the RF emission. For example, the predetermined modulation pattern can include a known predetermined bit sequence.

It will be appreciated that the generating step advantageously includes selectively modulating the transmitted RF signal. In order to produce a modulation of the receiver local oscillator, the transmitted RF signal can be amplitude modulated, frequency modulated, or phase modulate, or a combination of one or more of these. For example, amplitude modulation can include switching the transmitted output on and off in accordance with a known or predetermined modulation pattern. Consequently, the detecting step further includes detecting a presence of the modulation pattern in the RF emission. According to one aspect of the invention, the modulation pattern advantageously comprises a bit sequence.

The method is also useful for determining a range of a receiver. If range is to be determined, the method includes determining a time delay between transmission of one or more timing markers in the transmitted RF signal, and the subsequent detection of the timing marker or markers in the RF emission. The time delay corresponds to the amount of time necessary for the transmitted RF signal to travel from the transmitted to the receiver and for the RF emission to travel from the receiver to a monitoring device. A range of the receiver is determined based on the time delay.

The method also provides a process by which one can determine a minimum transmitter power necessary for communicating to the receiver. This process includes selectively varying a power level of the RF signal to determine a minimum power level necessary to cause the variation.

The method advantageously includes some means for notifying a user regarding the detection, range, direction, and link status. For example, a user notification can be generated to indicate that a receiver has been detected, that the receiver is receiving the RF signal, that the receiver has lost the signal, and the minimum power level required to communicate with the receiver.

The foregoing process can be implemented in a system for active ranging and detection of radio receiving devices. The system includes a monitoring device for monitoring one or more RF emission of the RF receiver, an RF transmitter operatively coupled to the monitoring device and configured for generating an RF signal on an RF frequency that can be received by the RF receiver. The monitoring device advantageously includes one or more RF signal processing circuits configured for detecting a variation in the RF emission responsive to the RF signal.

A receiver frequency of the monitoring device is tuned to receive RF energy originating from a local oscillator in the RF receiver. Alternatively, or in addition thereto, the receiver frequency of the monitoring device is tuned to receive one or more other emissions of the RF receiver as described above. In cases where the monitoring frequency or frequencies are not known, a search for those frequencies is possible by searching for the modulation pattern in a bandwidth covering the possible range of received emissions. This has the advantage over a simple frequency by frequency search in that the signal processing gain inherent in the detection of the predetermined modulation pattern (especially for patterns advantageously including a bit sequence) can help discriminate the desired monitoring frequency or frequencies from other radio frequency sources that are not of interest.

According to an aspect of the invention, the variation includes a modulation of the RF emission, such as an amplitude, phase, or frequency modulation, or a combination of these. The RF signal processing circuit is configured for detecting the predetermined modulation pattern in the RF emission. For example, the predetermined modulation pattern advantageously includes a bit sequence.

Consistent with the foregoing, the RF transmitter includes means for selectively modulating the RF signal. For example, the transmitter advantageously includes an amplitude, phase, or frequency modulator, or any combination of these, responsive to a modulation control circuit. The transmitter can thereby be configured to modulate the RF signal in accordance with a modulation pattern. The RF signal processing circuit provided in the monitoring device is advantageously configured for detecting a presence of the modulation pattern in the RF emission. Note that it is the modulation pattern that is detected—the exact type of modulation of the RF emission by that pattern can be different depending on the particular receiver design and the particular transmitted RF signal modulation type. The transmitted RF modulation type and the received emission modulation type are not necessarily the same or even similar.

The monitoring device can include one or more timers or other method configured to measure a time delay occurring between a transmission of a timing marker in the RF signal to the subsequent detection of the timing marker in the RF emission by the monitoring device. The resulting time delay or link delay is useful because it can be used to measure a distance to the receiver. Accordingly, the monitoring device further includes one or more processing circuits that are arranged for determining a range of the receiver based on the time delay. Measurement of the time delay can be used to resolve direction-finding ambiguity caused by multiple received emissions arriving by different paths due to reflections from environmental structures.

The system also includes a transmitter power control system. The transmitter power control system is arranged to selectively vary a power level of the RF signal. For example, the transmitter power control system can be used to selectively reduce a power level of the RF signal until the RF signal is a minimum power level necessary to cause the variation in the RF emission.

BRIEF DESCRIPTION OF THE DRAWINGS

Embodiments will be described with reference to the following drawing figures, in which like numerals represent like items throughout the figures, and in which.

DETAILED DESCRIPTION OF THE PREFERRED EMBODIMENTS

The invention will now be described more fully hereinafter with reference to accompanying drawings, in which illustrative embodiments of the invention are shown. This invention, may however, be embodied in many different forms and should not be construed as limited to the embodiments set forth herein. For example, the present invention can be embodied as a method, a data processing system, or a computer program product. Accordingly, the present invention can take the form as an entirely hardware embodiment, an entirely software embodiment, or a hardware/software embodiment.

The signal processing and control functions associated with the present invention can be realized in one computer system. Alternatively, the present invention can be realized in several interconnected computer systems. Any kind of computer system or other apparatus adapted for carrying out the methods described herein is suited. A typical combination of hardware and software can be a radio receiving equipment, transmitting equipment, digital signal processing equipment, and a general-purpose computer system. The general-purpose computer system can have a computer program that can control the computer system such that it carries out the methods described herein.

The present invention can take the form of a computer program product on a computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

Embodiments of the present invention will now be described with respect to FIG. 1 through FIG. 6. Some embodiments of the present invention provide methods, systems, and apparatus relating to the acquisition of information concerning a remote radio receiver. Such information includes (1) detecting the presence of a radio receiver, (2) determining a range of a remotely located radio receiver, (3) determining the direction of a remotely located radio receiver, (4) determining whether a remote receiver is receiving a transmitted signal, and (5) the minimum necessary transmitter power required to establish a communication link to the receiver.

Figure 1:
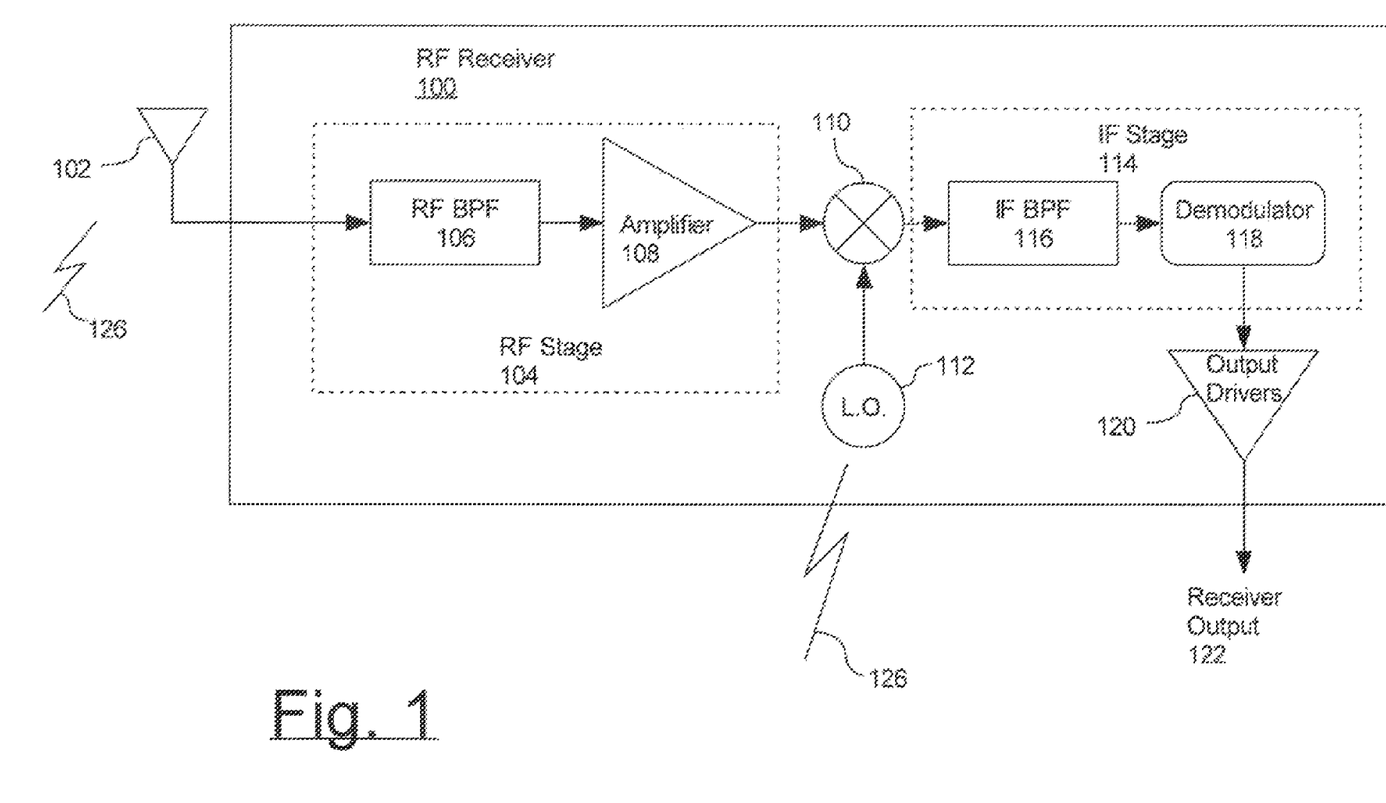
FIG. 1 is a block diagram of a superheterodyne type radio receiver that is useful for understanding the invention.

Referring now to FIG. 1, there is shown a block diagram of a conventional radio receiver 100 that is useful for understanding the present invention. The radio receiver 100 is a superheterodyne type design which is commonly used in the art. The radio receiver 100 includes an antenna 102 for converting electromagnetic waves to RF electronic signals. The RF signals are typically communicated from the antenna 102 to a receiver RF stage 104. The RF stage 104 typically includes a receiver front end filtering system, such as an RF band pass filter (BPF) 106. The BPF 106 limits the range of RF signals passed to subsequent components of the receiver. The RF stage 104 also typically includes one or more RF amplification devices such as amplifier 108.

Figure 3:
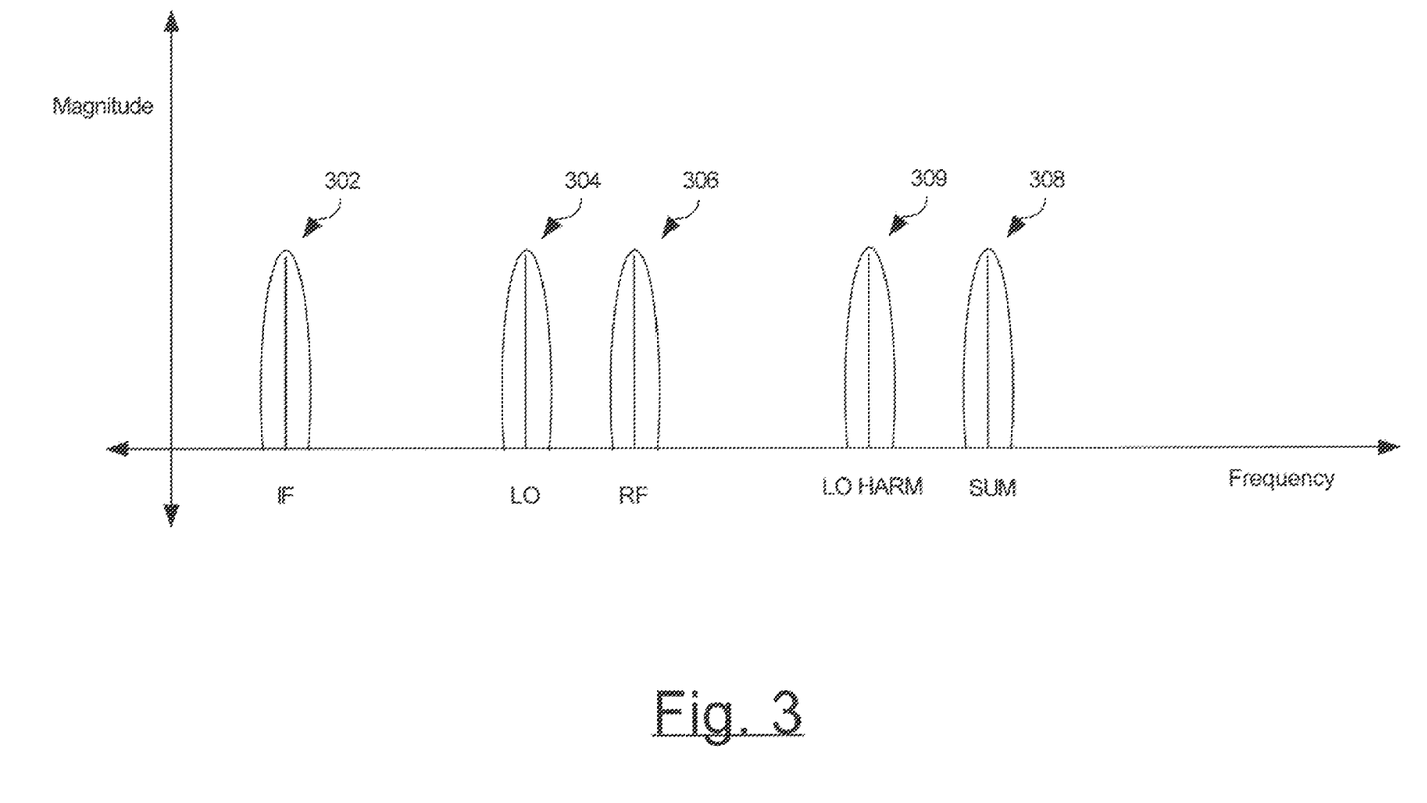
FIG. 3 is a plot of magnitude versus frequency that is useful for understanding the various signals that are associated with the receiver in FIGS. 1 and 2.

Amplified RF signals are generally communicated from the amplifier 108 to a mixer or mixing device 110. A local oscillator (LO) 112 is used to generate a second RF signal referred to herein as the LO signal. The LO signal and the RF signals from the amplifier 108 are mixed in the mixing device 110 to produce various mixing products which generally include a sum and difference frequency. The sum frequency is the sum of the frequencies of the received RF signal and the LO signal. The difference frequency is the difference between the frequencies of the received RF signal and the LO signal. Either the sum or difference frequency (most commonly the difference) is selected as an intermediate frequency (IF) for further receiver processing. The relationship between these various signals is illustrated in FIG. 3, which shows an RF signal 306, an LO signal 304, an IF signal 302, a sum signal (Sum) 308, and an LO harmonic signal LO HARM 309. In this example, the IF signal is the difference frequency output of the mixing device 110. The Sum signal is the sum frequency output of the mixing device 110, and the LO harmonic is the second harmonic of the local oscillator frequency, 2×LO.

Referring again to FIG. 1, the various signals described above are passed to one or more IF stages 114. In IF stage 114, an IF band pass filter (BPF) 116 is used to permit only the IF signal 302 to pass to subsequent receiver processing stages. The IF filter generally limits the bandwidth of the IF signal to that of the expected modulation signal for which the receiver is designed. One or more amplification stages and additional IF filtering (not shown) can also be provided. Ultimately, the IF signal will be communicated to a demodulator 118. Demodulator 118 demodulates analog or digital data carried by the IF signal and communicates such information to output driver circuitry 120. Output driver circuitry produces a receiver output 122.

The RF receiver 100 is exclusively designed for the purpose of receiving RF signals. The LO 112 is designed only to facilitate this receiving process. However, some of the RF energy produced by the LO 112 can radiate from the RF receiver 100. Similarly, the RF receiver 100 will typically produce other emissions, such as mixing products and LO harmonics. This is illustrated in FIG. 1 which shows an RF emission 126 from receiver 100. Such emissions can result from a variety of design and manufacturing features in the receiver design. It should be understood that the term RF emission as used herein refers to any such emissions of RF energy from the LO, LO harmonics, and mixing products. Further, it should be understood that the term RF emission as used herein exclusively refers to RF energy emitted from an RF receiving device that may not be essential to receiver functionality. Accordingly, such RF emissions should not be confused with any of the intended functionality of the receiver 100, such as audio, video, or data signals that the receiver is designed to generate as outputs.

Figure 2:
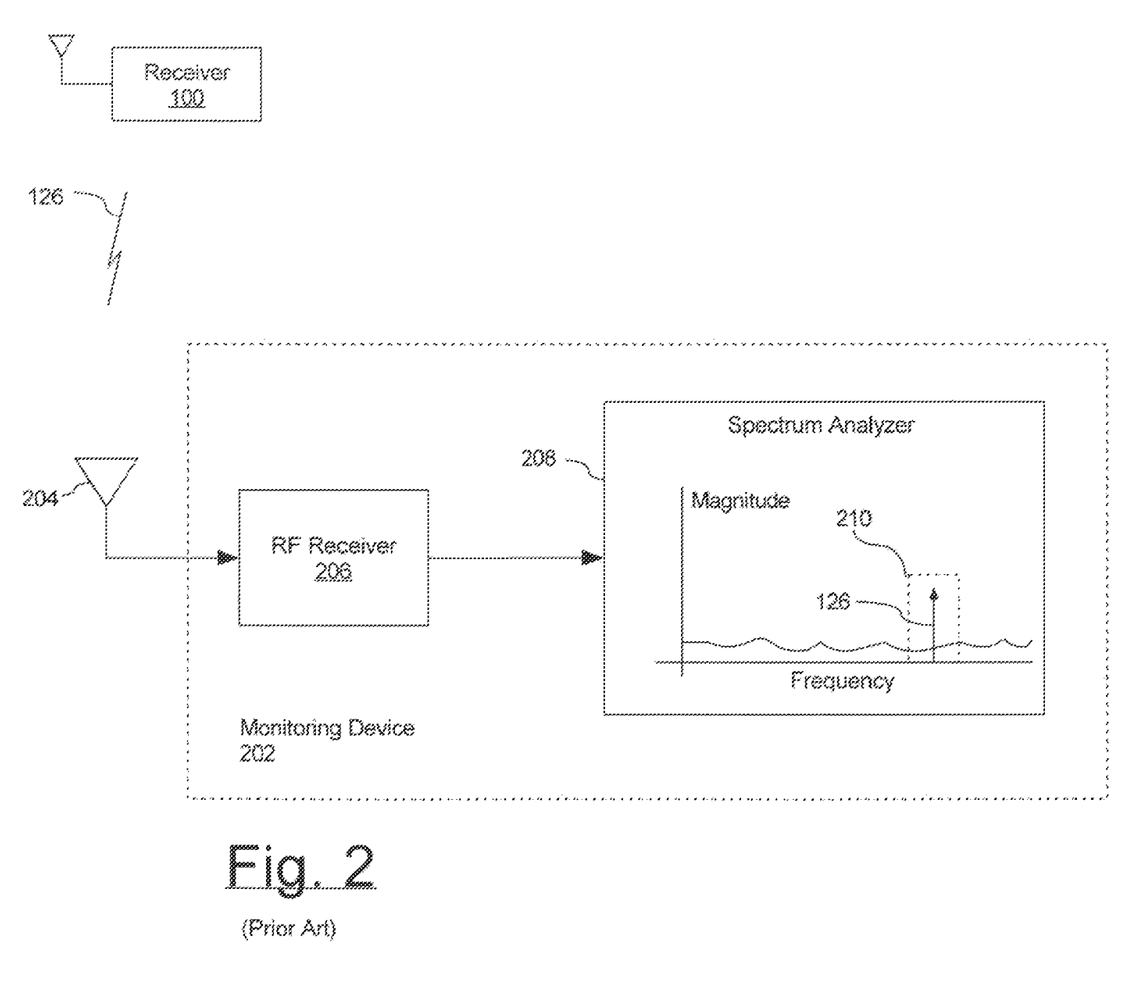
FIG. 2 is system diagram showing how the presence of a radio receiver can be detected.

Referring now to FIG. 2, conventional types of receiver detection equipment have commonly used the presence of such RF energy in order to detect the presence of a radio receiver. For example, in FIG. 2 a monitoring device 202 can include an antenna 204 for communicating the RF emissions to a narrow-band receiver 206. The receiver 206 can be coupled to a spectrum analyzer 208. The spectrum analyzer provides a means to scan certain frequency ranges 210 to detect the presence of the RF emission 126.

The present invention takes the foregoing detection process a step further. In particular, a transmitted RF signal is used to cause a perturbation or variation in the RF emissions 126 of the receiver to be analyzed. This variation can be detected and used to identify emissions from a particular receiver, and then further analyzed to provide useful information about the receiver.

Figure 4:
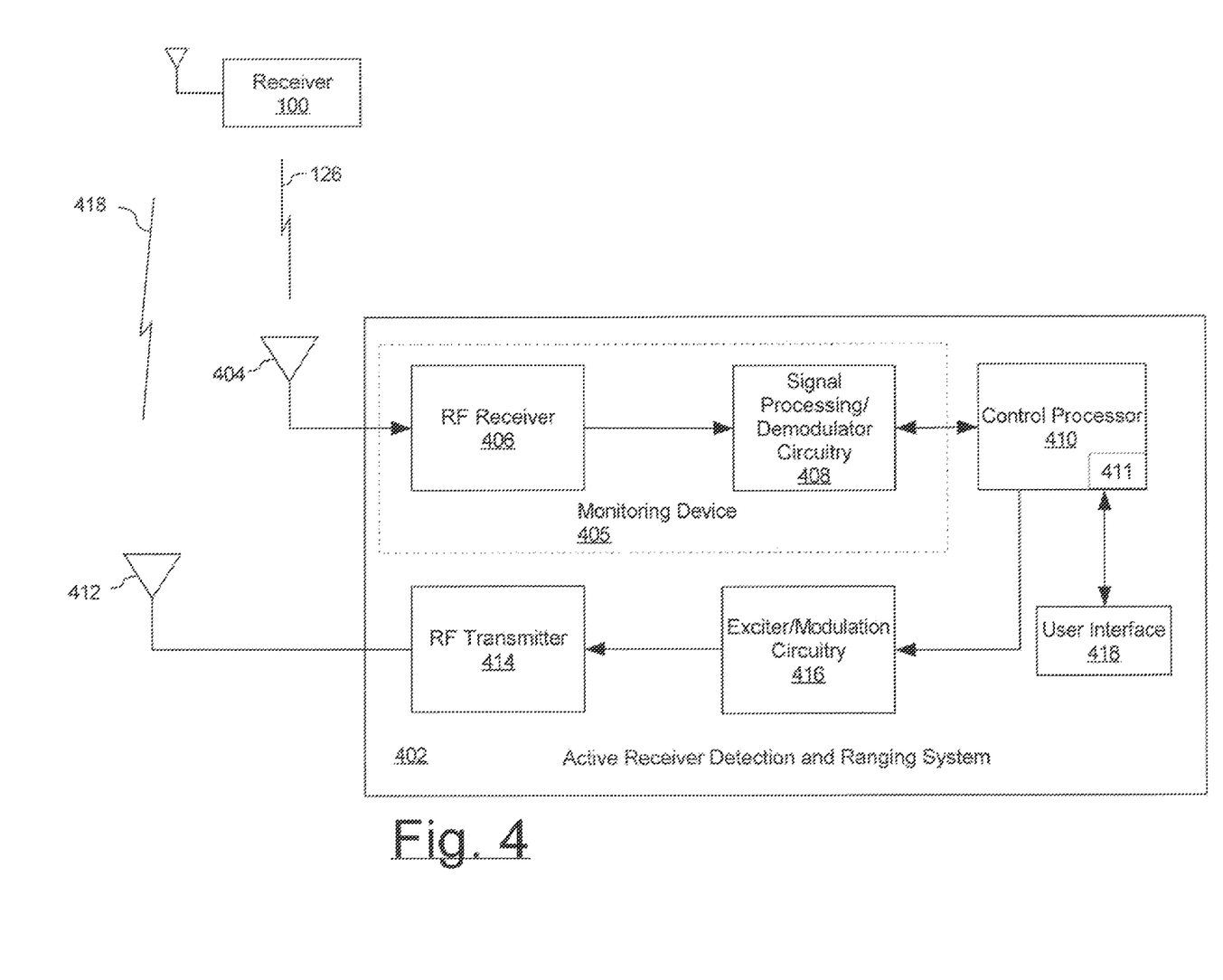
FIG. 4 is block diagram of a system for active receiver detection and ranging.

Turning now to FIG. 4, there is shown a block diagram of an active receiver detection and ranging system (ARDRS) 402 that is useful for understanding the invention. The system includes an antenna 402 for acquisition of RF energy associated with RF emissions 126 from a radio receiver 100. For example, the antenna 404 can include a directional antenna system capable of focusing antenna gain in a selected direction. The RF energy from antenna 404 is communicated to a monitoring device 405, which includes RF receiver 406 and signal processing/demodulator 408.

The RF receiver 406 can be a conventional design that is capable of receiving RF emissions 126. Those skilled in the art will appreciate that it can be desirable to obtain information concerning one or more different types of RF receivers 100. Accordingly, the RF receiver 100 can have a tuning range that covers RF emissions known to be associated with the various different types of RF receivers 100.

According to an embodiment of the invention, the RF receiver 406 has a relatively narrow receiver bandwidth that is capable of being tuned to one or more frequencies associated with known RF emissions 126. Alternatively, the receiver 406 can be a design that offers a bandwidth that is considerably larger. With a wider bandwidth design, the receiver 406 can provide the capability to concurrently receive one or more RF emissions 126 at various different RF frequencies. These RF emissions 126 can be an LO signal and/or other RF emissions, such as harmonics of the LO and/or mixing products, all of which originate from a common receiver 100.

Depending on the design of RF receiver 406, signal processing/demodulator circuitry 408 can be designed to process an RF emission on a single RF frequency or concurrently process a plurality of RF emissions existing on multiple RF frequencies. The signal processing/demodulator circuitry 408 also includes at least one demodulator. The demodulator is advantageously selected to be of a type that is capable of providing a demodulated output in the form of a signal which is a representation of a variation associated with the RF emission 126. For example, a frequency modulation (FM) discriminator circuit could be used for this purpose. FM discriminator circuits are well known in the art and therefore will not be discussed here in detail. Similarly, an AM demodulator can be used to detect variations in the amplitude of the RF emissions 126. Similarly, a phase modulation (PM) demodulator can be used to detect variations in the phase of the RF emissions 126. Similarly, a demodulator may be advantageously devised to demodulate any combination or one or more of these modulation formats simultaneously.

The ARDRS 402 also includes a transmitter antenna 412 coupled to an RF transmitter 414. Those skilled in the art will appreciate that RF transmitter 414 may in some cases be able to share a common antenna with RF receiver 406. For example, a single antenna can be used if such antenna will provide acceptable performance for receiving and transmitting signals as hereinafter described. In that case, a single antenna can be used in place of antennas 404 and 412, provided that appropriate isolation and diplexing or switching circuitry is provided to isolate RF receiver 406 from high power signals originating with the RF transmitter 414. Still, since a location of a receiver 100 may be unknown, it can be desirable in some instances for a receiver antenna 404 to have a different antenna gain pattern as compared to the antenna gain pattern of a transmit antenna 412. In such cases, it can be more advantageous to use separate antennas 404, 412.

The RF transmitter is a conventional design capable of transmitting RF signals on one or more frequencies that can be received by the RF receiver 100. It should be understood that RF receiver 100 can be of one or more different types. As such, different RF receivers 100 can have different operating frequency ranges. Accordingly, the transmitter 414 is advantageously designed to provide a transmit frequency range which includes frequencies at which one or more RF receivers 100 can receive signals. The RF transmitter 414 is excited by exciter/modulation circuitry 416. The exciter/modulation circuitry 416 can include an RF signal generator. The signal generator can include a phase locked loop (PLL) type RF generator to provide a stable source of RF energy for the RF transmitter. The PLL is preferably designed to produce RF energy at a selectable frequency within the range of the RF transmitter 414.

The exciter/demodulation circuitry 416 can also include a modulation circuit. The modulation circuit can include one or more of a phase modulator, a frequency modulator, an amplitude modulator, a modulator matching the type of signal normally received by the Receiver 100, and a modulator advantageously designed to maximize the variations in the emission or emissions. If multiple types of modulators are used, suitable control circuitry can be provided for selectively operating one or more modulators. Those skilled in the art will appreciate that the capability to simultaneously separately amplitude modulate and phase modulate a signal can reproduce any and all types of modulation. The exciter/modulation circuitry 416, RF transmitter 414 and antenna 412 as described herein are generally known in the art and therefore will not be described in great detail.

The ARDRS 402 also includes a control processor 410. Control processor 410 can be an ASIC, a microprocessor, a state machine, or a general purpose computer which has been programmed with a suitable set of instructions for implementing the methods described herein. The control processor includes one or more devices suitable for storing a set of program instructions and/or data. For example, a data store 411 can be provided for this purpose. Data store 411 can include RAM, ROM, and a bulk data storage device, such as a magnetic disc drive. The data store 411 is operatively connected to the control processor 410 by conventional means such as data busses and or control circuits (not shown). Note that although the preferred embodiment of the invention incorporates a control processor, the use of a control processor is not necessary to implement the basic functionality of the invention—to detect a receiver. Purpose-made or general purpose components may be assembled to provide the basic detection mechanism with no explicit control processing.

The control processor 410 communicates with one or more of the components of the ARDRS 402 by means of a suitable data bus or control lines. For example, the control processor 410 can receive demodulated signals from the signal processing/demodulator circuitry 408. It can also communicate command and control signals to control the monitoring device 405. Such signals can be used to control any functions performed by the RF receiver 406 and signal processing/demodulator circuitry 408. The control processor 410 also advantageously provides control signals to the exciter/modulation circuitry 416 to control the output of RF transmitter 414. In general, the control processor 410 controls the operation of the monitoring device 405, RF transmitter 414, and the exciter/modulation circuitry 416. A plurality of monitoring devices 405 can be used to detect signals at different frequencies or different sub-bands of frequencies, different modulation types, or any combination of these.

The control processor 410 also communicates with a user interface 418. The user interface 418 can communicate information to a user regarding any RF receiver 100 detected by the ARDRS 402. For example, the user interface 418 can be used to identify a distance or range to the receiver 100, whether or not a receiver 100 is receiving a signal from the ARDRS 402, and the minimum transmit power necessary for signals to be received by RF receiver 100. The user interface 418 can also provide means for a user to communicate input commands to control the operation of the ARDRS 402 as hereinafter described.

Figure 5A:
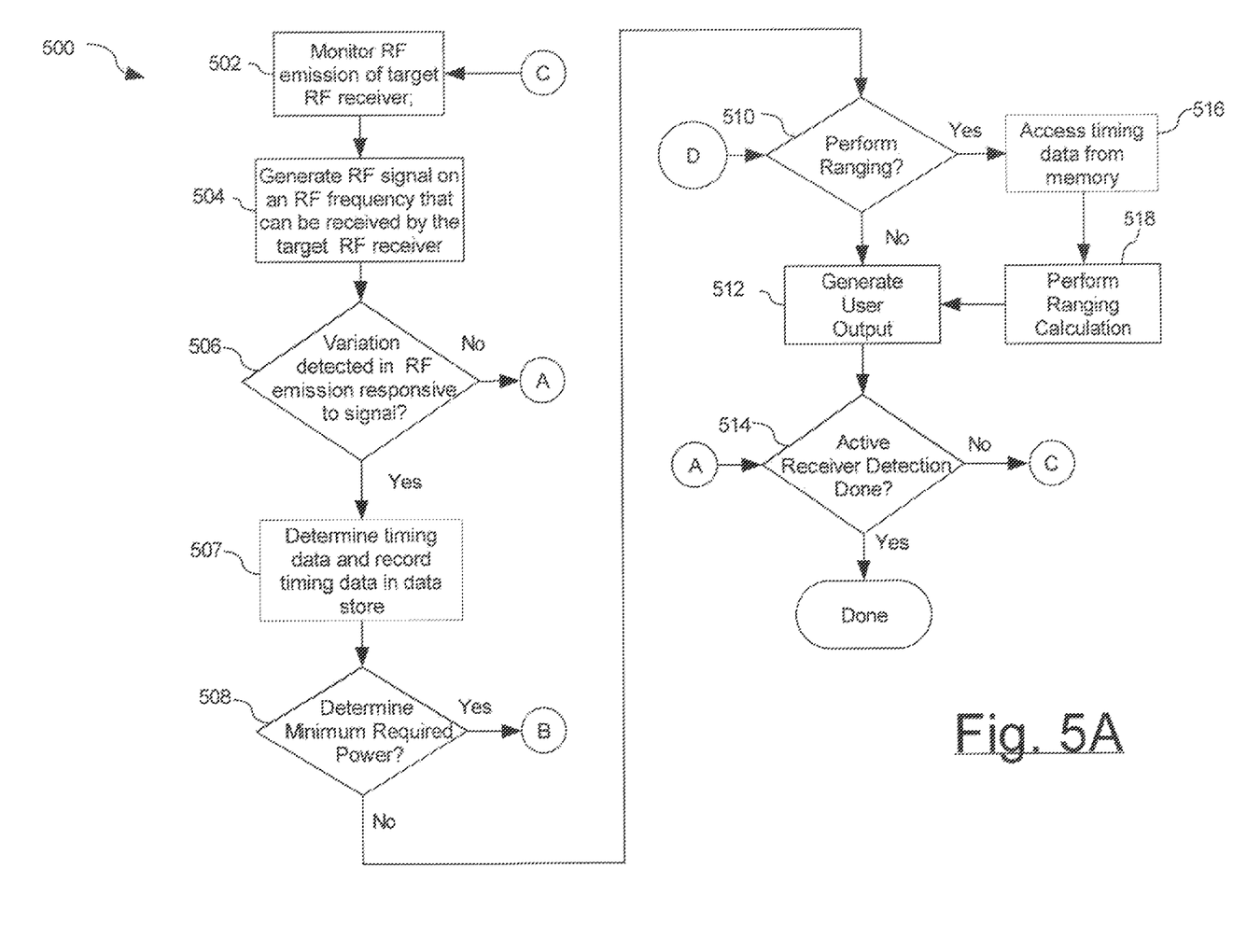
FIG. 5 is flow chart that is useful for understanding a method for active receiver detection and ranging.
Figure 5B:
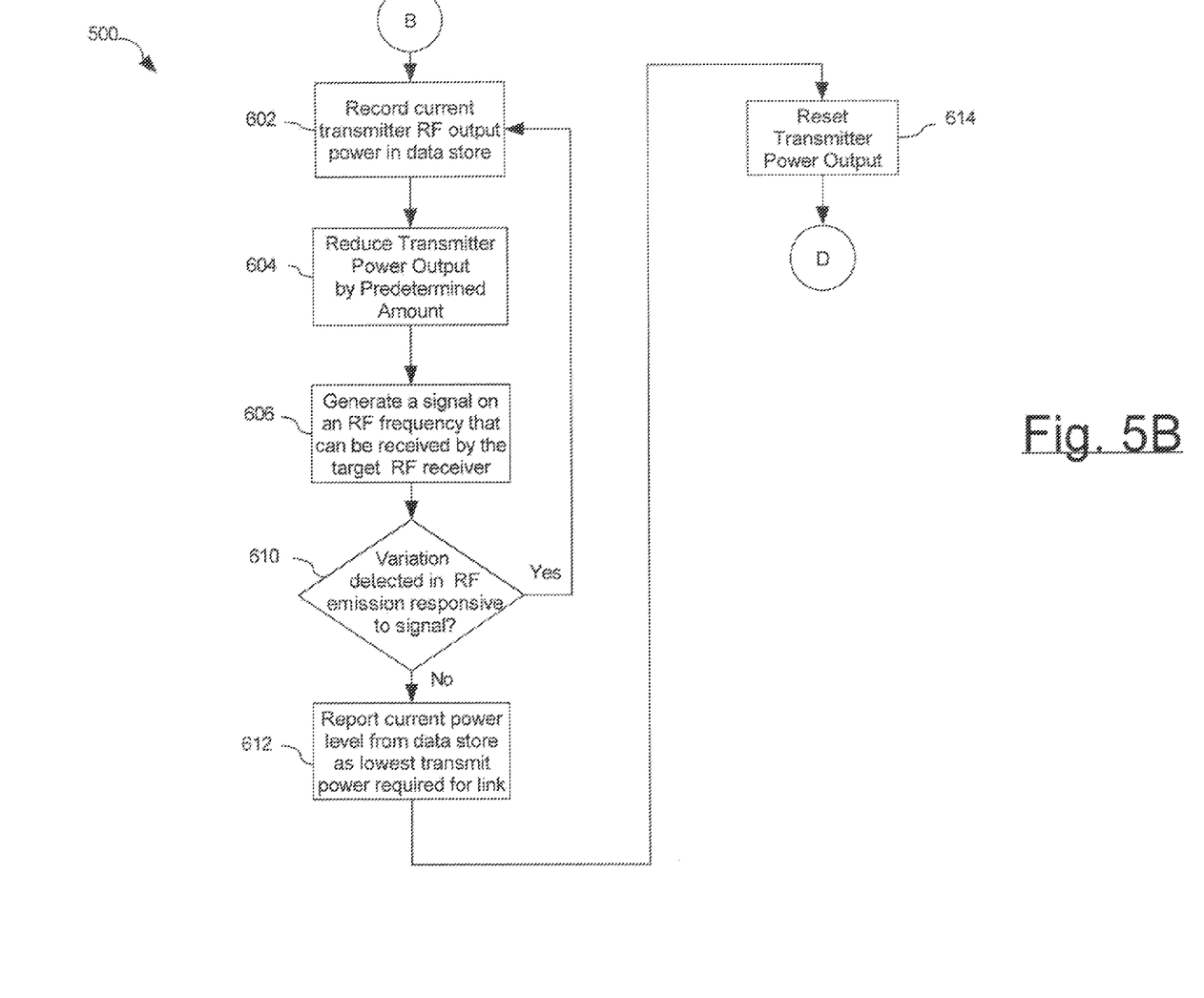

The system described in FIG. 4 can be useful for implementing an active receiver detection and ranging system in accordance with the invention. Referring now to FIGS. 5A and 5B, there is shown a process 500 that is useful for understanding the method for obtaining information regarding an RF receiver 100. The method begins in step 502 with monitoring an RF emission 126 of an RF receiver 100. For example, this step can be performed by monitoring device 405 operating in conjunction with the control processor 410. In order to perform this step, it is preferred to have some preexisting knowledge as to the likely frequency of the RF emission 126. This information can be obtained as a result of industry knowledge, forensic investigation, or intelligence gathering activities. If an RF emission 126 is detected, it can be assumed that an RF receiver 100 of a predetermined type is present. The information regarding the type of RF receiver 100 that has been detected can thereafter be used in step 504. Alternatively, if an RF emission is not detected, the process can continue as described below under the assumption that an RF receiver 100 may be present in the area.

In step 504, the control processor 410 can cause exciter/modulation circuitry 416, RF transmitter 414 and antenna 412 to generate an RF signal 418 on an RF frequency that can be detected by the RF receiver 100. The details of this RF signal will be discussed in greater detail below. However, it should be understood that the RF signal 418 will cause a perturbation or variation in the RF emission 126 if it is received by the receiver 100. For example, each time the RF signal 418 is received by the receiver 100, it will cause a slight shift in the frequency, phase, and/or amplitude of the LO 112 and the harmonics of such LO. This behavior is called local oscillator modulation or LOM.

In particular, an amplitude modulated RF signal 418 that is modulated by a square wave waveform will cause power supply voltage variations in the circuitry of the receiver 100. These variations may be due to overdrive of RF and IF circuits, normal current draw variations from the receiver 100's demodulation circuitry 118 that correspond to the modulation input, normal current draw variations in the output driver circuits 120 as it reproduces the waveform, or other causes. There can also be other mechanisms that cause amplitude, phase, and/or frequency modulations depending on the particular design of the receiver. Furthermore, because mixers and oscillators are inherently non-linear, emissions at twice, three times, and so on, the frequency of the local oscillator (its second, third, etc. harmonics) can be generated and radiated, all synchronized with the modulation of the RF signal 418. FIG. 3 illustrates the second harmonic of the LO, LO HARM 309. Of course, the invention is not limited to a square wave amplitude modulation format. Any other waveform can be used that will cause modulation of the receiver's local oscillator, its harmonics, and mixing products. Use of a wide bandwidth modulation signal (such as a frequency chirp, square wave, or random or pseudorandom modulation) may be preferred since this can result in a wider bandwidth emission, that can be more easily detected due to the inherent processing gain advantage for a given detection time when using a filter matched to the modulation pattern.

A similar effect will occur with regard to other emissions, such as mixing products. When the RF signal 418 is processed in mixer 110, it will produce various mixing products, including a Sum signal 308. The amplitude of the Sum signal 308 and other mixing products will vary within some predetermined range in response to variations in the amplitude of the RF signal 418. In fact, any RF signal 418 within the receive bandwidth of receiver 100 can be transmitted to the receiver 100 and can be re-emitted at the Sum frequency 306. The limitation on such amplitude variations can correspond to the point at which the front end circuitry of receiver 100 becomes saturated. If the RF signal 418 is a particular waveform, the waveform is detectable in the Sum signal 308 and any other harmonics of the Sum signal. In any case, it will be appreciated that in this way the RF signal 418 can be used to modulate the amplitude, phase, and/or frequency of the RF emission 126.

It has been found that the Sum 308 signal is particularly useful as an RF emission 126. The usefulness of this particular signal arises from the fact that it is often spaced further apart in frequency from the RF signal 306 as compared to the frequency of the LO signal 304. Having the received signal 126 be significantly different from the RF signal 418 in frequency can simplify the design of circuitry necessary to isolate the monitoring device 405 from high power output of the RF transmitter 414. For example, the filtering requirements for RF receiver 406 can be less demanding because the Sum signal 308 or LO HARM signal 309 is further away in frequency from the RF signal 418 which generally corresponds to RF frequency 306.

The amplitude, phase, and/or frequency shift in RF emission 126 can be detected. It should be understood that as used herein, the term "RF emissions" include one or more of the LO signal 304, LO harmonics e.g. 309, mixing products including Sum 308, and various harmonics of these signals which radiate from RF receiver 100. Furthermore, "RF emissions" can include signals generated from the RF receiver using design considerations to transmit or re-radiate received signals.

In step 506, a determination is made as to whether a variation or perturbation has been detected in RF emission 126 in response to the RF signal 418. This determination can be performed by control processor 410. For example, signal processing/demodulator circuitry 408 can communicate a signal to control processor 410 which indicates a variation has occurred in a frequency of RF emission 126. If the control processor 410 determines that such a variation has occurred in response to a transmitted RF signal 418, then this serves as an indication that the RF receiver 100 is receiving the RF signal 418 transmitted from the ARDRS 402. Consequently, the process can continue on to stop 507.

In step 507, the control processor 410 can determine an amount of time that has elapsed between the time that the RF signal 418 is generated in step 504 and the time when a variation in the RF emission 126 corresponding to RF signal 418 was detected by the monitoring device 405. This timing data is stored in a memory location such as data store 411. Thereafter, the process continues on to step 508. The purpose of the timing data will be described in more detail below.

In step 508, a determination is made by control processor 410 as to whether the analysis of receiver 100 will include a determination of the minimum transmitter RF output power necessary for receiver 100 to receive signals from ARDRS 402. If the analysis does include a determination of the minimum required transmitter RF output power, then the process proceeds to step 602. In step 602, the control processor stores in a memory location of a data store a value representative of the current RF output power setting for the RF transmitter 414. For example, the value initially stored can be the maximum transmitter RF output power. In step 604, the control processor reduces the RF output power from RF transmitter 414 by some predetermined amount. For example, the RF output power can be reduced by 1 dB, 2 dB, or 3 dB. This reduction in RF output power can be accomplished by any one of several ways. For example, the RF output power from the exciter/modulation circuitry 416 can be reduced by some predetermined amount, which will reduce the RF output power from the RF transmitter 414.

Following the adjustment to reduce the RF output power in step 604, the method can continue on to step 606. In step 606, the control processor 410 can control the exciter/modulation circuitry 416 and/or RF transmitter 414 to cause them to transmit an RF signal 418 on an RF frequency that can be received by the RF receiver 100. The RF signal is transmitted at the power level established in step 604. The control processor 410 can then determine in step 610 whether the RF signal 418 has caused a variation in the RF emission 126. The variation will coincide with the presence of the RF signal 418. If such a variation is detected, then that can be understood as an indication that the RF signal 418 was of sufficient power to cause the receiver 100 to receive the RF signal 418. Accordingly, the process returns to step 602 and records the current RF output power value. Thereafter, steps 604 through 608 are repeated at progressively lower RF output power levels until little or no variation in RF emission 126 is detected in step 610.

When no variation is detected in step 610, this can be understood to mean that the current RF output power level is too low to be received by receiver 100. The process then continues on to step 612 in which the system records that the RF output power value stored in the data store in step 602 is used to calculate the lowest RF output power level that can be used for establishing a communication link from the ARDRS 402 to the receiver 100. Once this value has been determined, the process can continue to step 614 in which the RF output power level is reset. This step can involve setting the RF output power level to the minimum required RF power level for communicating with the receiver 100, as determined in steps 602 through 612. Alternatively, this step can involve setting the RF output power level back to the maximum power output. Of course, some intermediate value between these two extremes could also be selected, or a control loop can be implemented to enable continuous determination of the required power level.

Following step 614, the process continues on to step 510. Similarly, if it is determined in step 508 that there is no need to determine a minimum required power in step 508, then process can proceed directly to step 510 without executing steps 602 through 614. In step 510, a determination is made as to whether the analysis of the receiver 100 should include a range determination. The range determination is a process for determining a distance from the ARDRS 402 to the receiver 100. If such an analysis is to be performed, then the process continues to step 518 in which the control processor 410 calculates a distance between the ARDRS 402 and the receiver 100. The timing data represents the time required for RF signal 418 to travel from ARDRS 402 to the RF receiver 100, cause a variation in RF emission 126, and for RF emission 126 to travel from receiver 100 to the ARDRS 402. Those skilled in the art will appreciate that this timing data, combined with the well known velocity of radio waves in free space, and any known signal processing delays associated with the monitoring device 402 and propagation delays through the RF receiver 100, is sufficient information to calculate a distance between the ARDRS 402 and the RF receiver 100.

Once this range or distance has been calculated in step 518, the process continues to step 512. In step 512, the control processor 410 advantageously generates an output notification to a user to indicate that a receiver 100 has been detected. The output notification can optionally include the minimum RF power required to communicate RF signals to the receiver 100, and the range to the receiver 100. Further, if the system described herein is combined with a directional antenna array or two or more antennas, then the output notification to the user can also include a bearing to the receiver 100.

In step 514, the control processor 410 can determine whether the active receiver detection process is complete. Completion of the process can depend, for example, on a user input from user interface 418 terminating the process. If the active receiver detection process is complete then the process terminates. Otherwise, the process can return to step 502. Repeating the process can be advantageous for increasing the accuracy of the range measurement described above. For example, the repetition of the range measurement process can be used to gather additional data for interpolation (dithering) of signals. By incrementing the frequencies (from a list or range of specified frequencies) of the monitor 405 and the transmitter 414 tuning frequencies at this point and restarting at Step 502, a scan of a frequency band or bands may be effected for the case when the exact channel or frequency on which the receiver 100 is tuned is unknown.

It should be understood that the RF signal 418 can take a variety of different forms, all of which are intended to be included within the scope of the present invention. For example, the RF signal 418 can have any combination of amplitude, phase, or frequency modulation in accordance with a bit sequence. This bit sequence can define a predetermined modulation pattern. This predetermined modulation pattern will cause the variation in RF emission 126 to occur in accordance with the modulation pattern. For example, if the RF signal 418 is amplitude modulated so that it is turned on and off in accordance with a sequence of data bits, then the RF emission 126 can be expected to vary in phase, frequency, or amplitude each time the RF signal 418 is turned on or off. The frequency of the RF emission 126 will therefore be modulated in accordance with the bit pattern in a manner which is similar to frequency shift keying (FSK), phase shift keying (PSK), amplitude shift keying (ASK), or any combination of amplitude and phase modulation.

The predetermined modulation pattern can be any sequence of data bits. According to one embodiment of the invention, the control processor 410 can generate a pseudo-random sequence of data bits that is based directly or indirectly on a pseudorandom number provided by an algorithm. Techniques for generating pseudo random numbers are well known in the art.

Alternatively, or in addition to such pseudo random techniques, the RF signal 418 can vary somewhat in frequency during the time it is transmitted. For example, the signal can be transmitted in the form of a chirp which increases or decreases in frequency over some period of time. For example, each pulse of transmitted RF energy can be chirped in this way. The variation in the frequency of the RF signal 418 can cause a further variation in the frequency of the RF emission 126. Of course, the invention is not limited in this regard, and any suitable signal format can be used for RF signal 418.

The selection of said modulation pattern to include a sequence of data bits can be convenient for permitting the control processor to determine that the variation in RF emission 126 is the result of the RF signal 418, and not some other unanticipated effect. However, using a sequence of data bits in this way has other advantages as well. For example, the sequence of data bits can be used to provide additional processing gain that is useful for recovering weak RF emissions 126 from a noisy RF environment. Conventional techniques, such as convolution processing or correlation, can be used to perform such processing and thereby aid in the detection of any variations that occur in the RF emissions 126. Such processing techniques are well known in the art and therefore will not be described here in detail. However, it should be understood that any suitable signal processing technique can be used to provide additional signal processing gain as would be understood by one skilled in the art.

The invention described and claimed herein is not to be limited in scope by the preferred embodiments herein disclosed, since these embodiments are intended as illustrations of several aspects of the invention. For example, although the invention has been described with respect to a receiver 100, it will be appreciated that the receiver can be part of a transceiver system. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

We claim:

1. A method for obtaining information concerning an RF receiver, comprising:
   monitoring at least one RF emission emitted from said RF receiver;
   generating an RF signal on an RF frequency that can be received by said RF receiver;
   transmitting said RF signal in at least a direction towards said RF receiver for causing a variation in said RF emission emitted from said RF receiver;
   detecting said variation in said RF emission emitted from said RF receiver; and
   determining a range to said RF receiver by determining a timing difference between an occurrence of a marker in said RF signal and an occurrence of said variation in said RF emission.

2. The method according to claim 1, wherein said monitoring step further comprises selecting said RF emission to include RF energy originating from a local oscillator in the RF receiver.

3. The method according to claim 2, wherein said monitoring step further comprises selecting said RF emission to include an emission of said RF receiver selected from the group consisting of a mixing product and RF energy harmonically related to a fundamental frequency of said local oscillator.

4. The method according to claim 1, further comprising selecting said variation to include a modulation of said RF emission.

5. The method according to claim 4, further comprising selecting said modulation from the group consisting of an amplitude, phase, and frequency modulation.

6. The method according to claim 4, wherein said detecting step further comprises detecting a predetermined modulation pattern in said RF emission.

7. The method according to claim 6, further comprising selecting said predetermined modulation pattern to include a bit sequence.

8. The method according to claim 1, wherein said generating step further comprises selectively modulating said RF signal.

9. The method according to claim 8, further comprising selecting said modulation to include at least one of an amplitude modulation, phase modulation, frequency modulation, and an in-phase/quadrature modulation.

10. The method according to claim 8, wherein said generating step further comprises modulating said RF signal in accordance with a modulation pattern.

11. The method according to claim 10, wherein said detecting step further comprises detecting a presence of said modulation pattern in said RF emission.

12. The method according to claim 10, further comprising selecting said modulation pattern to comprise a bit sequence.

13. The method according to claim 1, further comprising determining the direction of said receiver in the presence of multiple reflections of said RF emission by use of direction finding techniques.

14. The method according to claim 1, further comprising responsive to said detecting of said variation, automatically generating a notification to indicate that said RF receiver is receiving said RF signal.

15. The method according to claim 1, further comprising selectively varying a power level of said RF signal to determine a minimum power level necessary to cause said variation.

16. A method for obtaining information concerning an RF receiver, comprising:
   monitoring at least one RF emission of said RF receiver;
   generating an RF signal on an RF frequency that can be received by said RF receiver;
   detecting a variation in said RF emission responsive to said RF signal; and
   determining a time delay between a transmission of a timing marker in said RF signal, when transmitted at a location remote from said receiver, to the subsequent detection of said timing marker in said RF emission.

17. The method according to claim 16, further comprising determining a range of said receiver based on said time delay.

18. A system for obtaining information concerning a remotely located RF receiver, comprising:
   a monitoring device for monitoring at least one RF emission emitted from said RF receiver;
   an RF transmitter operatively coupled to said monitoring device, said RF transmitter configured for generating an RF signal on an RF frequency that can be received by said RF receiver and for transmitting said RF signal in at least a direction towards said RF receiver for causing a variation in said RF emission emitted from said RF receiver; and
   wherein said monitoring device comprises at least one RF signal processing means configured for detecting said variation in said RF emission emitted from said RF receiver, and for determining a range of said RF receiver by determining a timing difference between an occurrence of a marker in said RF signal and an occurrence of said variation in said RF emission.

19. The system according to claim 18, wherein a receiver frequency of said monitoring device is tuned to receive RF energy originating from a local oscillator in the RF receiver.

20. The system according to claim 18, wherein a receiver frequency of said monitoring device is tuned to receive at least one emission of said RF receiver selected from the group consisting of a mixing product and RF energy harmonically related to a fundamental frequency of said local oscillator.

21. The system according to claim 18, wherein said variation comprises a modulation of said RF emission.

22. The system according to claim 21, wherein said modulation is selected from the group consisting of a phase modulation, frequency modulation, and an amplitude modulation, and an arbitrary in-phase/quadrature modulation.

23. The system according to claim 21, wherein said signal processing means is configured for detecting a predetermined modulation pattern in said RF emission.

24. The system according to claim 23, wherein said predetermined modulation pattern includes a bit sequence.

25. The system according to claim 24, wherein said RF transmitter is responsive to a modulation control circuit configured to modulate said RF signal in accordance with a modulation pattern.

26. The system according to claim 18, wherein said RF transmitter further comprises modulation means for selectively modulating said RF signal.

27. The system according to claim 26, wherein said modulation means comprises a modulation circuit comprising at least one of an amplitude modulator, phase modulator, and a frequency modulator.

28. The system according to claim 27, wherein said RF signal processing circuit is configured for detecting a presence of said modulation pattern in said RF emission.

29. The system according to claim 27, wherein said modulation pattern comprises a bit sequence.

30. The system according to claim 18, further comprising a transmitter power control system responsive to said monitoring device and configured to selectively vary a power level of said RF signal.

31. The system according to claim 30, wherein said transmitter power control system is configured to selectively reduce a power level of said RF signal until said RF signal is a minimum power level necessary to cause said variation.

32. A system for obtaining information concerning a remotely located RF receiver, comprising:
  a monitoring device for monitoring at least one RF emission of said RF receiver; and
  an RF transmitter operatively coupled to said monitoring device and configured for generating an RF signal on an RF frequency that can be received by said RF receiver;
  wherein said monitoring device comprises at least one RF signal processing means configured for detecting a variation in said RF emission responsive to said RF signal, and at least one timer configured to measure a time delay occurring between a transmission of a timing marker in said RF signal, as transmitted at a location remote from said receiver, to the subsequent detection of said timing marker in said RF emission by said monitoring device.

33. The system according to claim 32, wherein said time delay is measured by determining a correlation between said RF signal modulation pattern and said received RF emission modulation pattern.

34. The system according to claim 32, wherein said monitoring device further comprises at least one processing circuit configured for determining a range of said receiver based on said time delay.

35. The system according to claim 32, wherein a bit sequence is used to provide a correlator output from said RF signal processing circuit in order to determine multipath components and thereby distinguish direct path from non-direct or reflected paths.

36. The system according to claim 35, wherein said direct path information is used for direction finding and reduce or eliminate the directional ambiguity due to multipath.

* * * * *